INVENTORS
CLYDE A. BROWNE
ELMER E. REESE
BY W. E. Finken
THEIR ATTORNEY

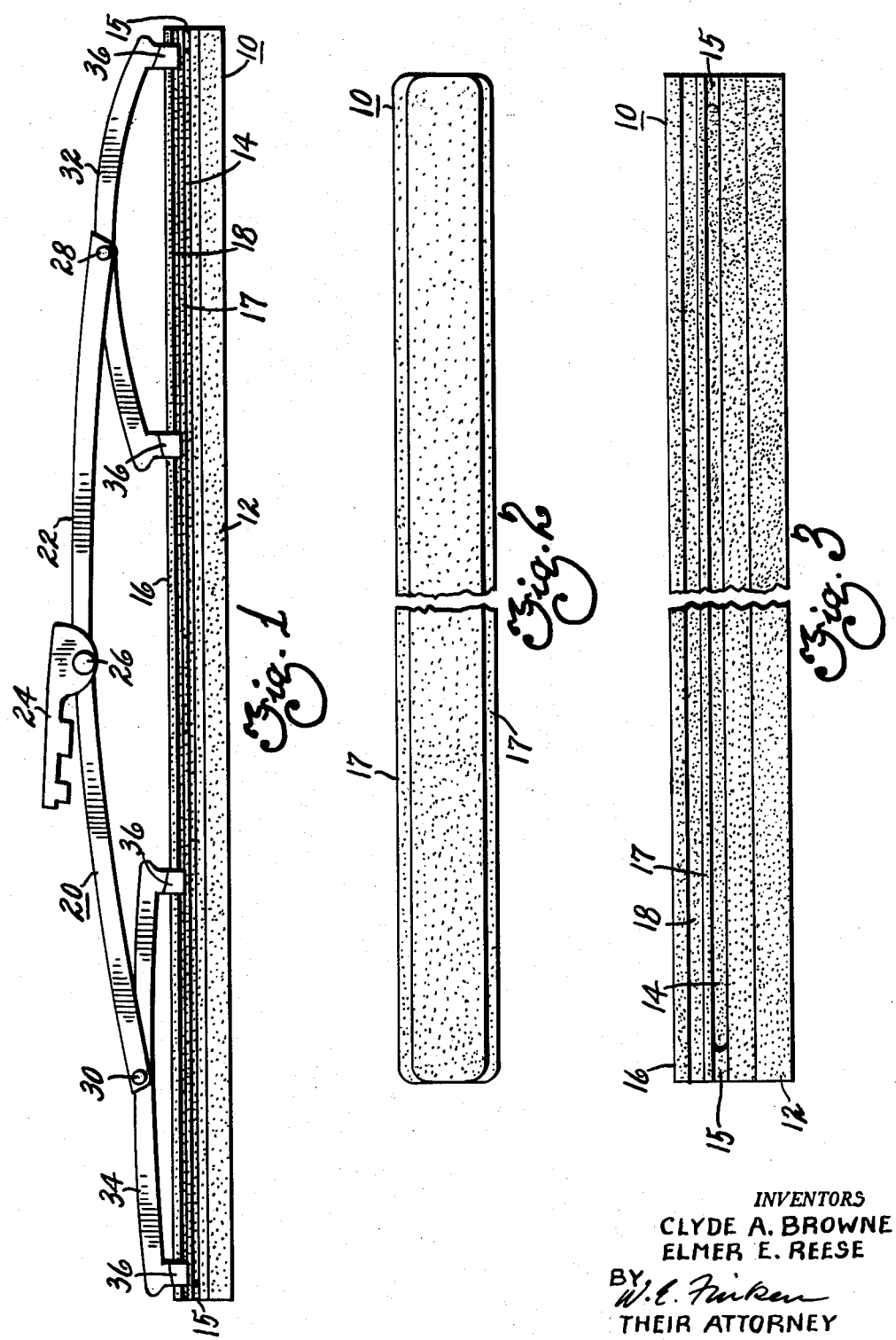

United States Patent Office 3,116,508
Patented Jan. 7, 1964

3,116,508
UNITARY SQUEEGEE AND WIPER BLADE
ASSEMBLY EMBODYING THE SAME
Clyde A. Browne, Brockport, and Elmer E. Reese,
Rochester, N.Y., assignors to General Motors Corporation, Detroit, Mich., a corporation of Delaware
Filed Nov. 25, 1960, Ser. No. 71,546
20 Claims. (Cl. 15—250.42)

This invention pertains to windshield wipers, and particularly to an improved squeegee unit for use in windshield wiper blade assemblies adapted to wipe substantially flat or curved surfaces.

Heretofore, commercially used windshield wiper blade assemblies adapted to wipe substantially flat and curved surfaces have embodied a squeegee unit comprising a flexible, resilient, elongate rubber or rubber-like squeegee and a flexible metal backing strip having a greater width than thickness such that when the backing strip is assembled with the squeegee the resultant squeegee unit is readily flexible in a plane normal to the surface to be wiped but substantially inflexible in a plane parallel to the surface to be wiped. The squeegee unit in prior commercial windshield wiper blade assemblies is carried by a pressure distributing linkage, or superstructure, comprising a plurality of pivotally interconnected and relatively movable levers, or yokes, having their free ends movably connected to the backing strip at longitudinally spaced apart points for applying wiper arm pressure and distributing the wiper arm pressure throughout the length of the squeegee unit to maintain the squeegee unit in contact with the surface to be wiped. While this type of windshield wiper blade assembly satisfactorily wipes curved as well as substantially flat, or planar, windshield surfaces it has several inherent disadvantages, namely noisy operation due to the metal to metal connections between the backing strip and the pressure distributing linkage; the likelihood of contact between the metal backing strip and the surface of the windshield under extreme drag conditions causing the surface of the windshield to become scratched; and the relatively high cost of manufacture due primarily to the labor involved in assembling the backing strip with the squeegee to form the squeegee unit.

The present invention relates to a unitary squeegee and a wiper blade assembly embodying the same which obviates the disadvantages of prior commercial wiper blade assemblies alluded to hereinbefore. Accordingly, among our objects are the provision of a unitary squeegee having greater flexibility in a plane normal to the surface to be wiped than in a plane parallel thereto; the further provision of a unitary squeegee comprising a body of rubber or rubber-like material having a plurality of portions of different hardness; and the still further provision of a wiper blade assembly comprising a unitary squeegee and a pressure distributing linkage for distributing wiper arm pressure to longitudinally spaced apart points of said unitary squeegee.

The aforementioned and other objects are accomplished in the present invention by utilizing two or more laminae of different hardness rubber or rubber-like material in the squeegee and simultaneously curing the rubber laminae in a mold to form a unitary squeegee. The resultant unitary squeegee is quite flexible in a plane normal to the surface to be wiped, and less flexible in a plane parallel to the surface to be wiped due to the cross-sectional configuration thereof, i.e., the squeegee has a retention portion of greater width than thickness.

The unitary squeegee can be interconnected with any known type pressure distributing linkage, or superstructure, to form a wiper blade assembly. Thus, the superstructure can comprise a plurality of pivotally interconnected yokes, a plurality of stacked levers, or a combination of yokes and levers. In the specifically disclosed embodiment, the pressure distributing linkage comprises a primary yoke having a substantially centrally arranged arm attaching part and a pair of secondary yokes pivotally connected to the ends of the primary yoke. Opposite ends of the secondary yokes are formed with feet, or claws, adapted to straddle the retention portion of the unitary squeegee and apply wiper arm pressure at four spaced apart points along the length of the squeegee, two adjacent the ends thereof and two intermediate the ends thereof. It is to be understood that the claws, or feet, of the secondary yokes have lost motion, or sliding, connections with the retention portion of the unitary squeegee, and any suitable means known in the art may be utilized to retain the pressure distributing linkage in assembled relation with the unitary squeegee, so as to prevent disassembly thereof during operation.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a longitudinal view, in elevation, of the windshield wiper blade assembly embodying the unitary squeegee of this invention.

FIGURE 2 is a fragmentary plan view of the unitary squeegee.

FIGURE 3 is a fragmentary side elevational view of the unitary squeegee.

Figure 4:
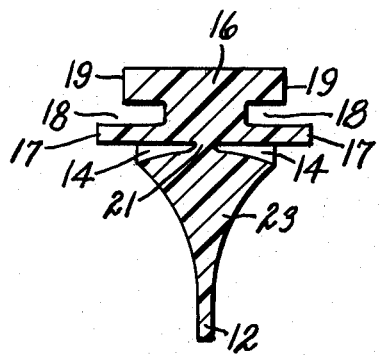
Figure 5:
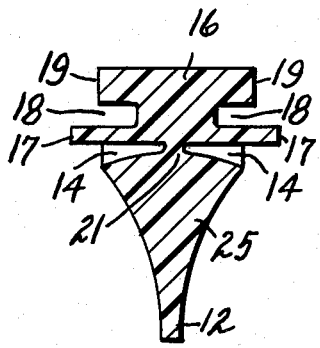

FIGURES 4 through 8, respectively, are sectional views of various forms of unitary squeegees.

With particular reference to FIGURE 1, a wiper blade assembly for flat, or planar, surfaces as well as curved surfaces is shown comprising a unitary squeegee 10 and a pressure distributing linkage, or superstructure, 20. The pressure distributing linkage 20 is only exemplary and is not to be construed by way of limitation. This pressure distributing linkage comprises a channel-shaped primary yoke, or holder, 22 having a substantially centrally arranged arm attaching clip, or connector, 24 connected thereto by means of a pivot 26 permitting relative pivotal movement between the primary yoke and the connector 24 about an axis transverse to the longitudinal axis of the wiper blade assembly. The connector 24 is adapted to detachably interconnect the wiper blade assembly with a conventional windshield wiper arm for applying wiper arm pressure to the wiper blade assembly and maintain the same in engagement with the surface to be wiped.

Opposite ends of the channel-shaped primary yoke 22 are pivotally connected by transversely arranged pins 28 and 30 to the channel-shaped secondary yokes 32 and 34, respectively. Portions of the secondary yokes 32 and 34, in accordance with conventional practice, are disposed between the side walls of the channel-shaped primary yoke in meeting relation. The ends of the secondary yokes 32 and 34 are formed with claws, or feet, 36 adapted to straddle the retention portion of the unitary squeegee 10 as will be pointed out more particularly hereinafter.

With particular reference to FIGURES 2 and 3, the unitary squeegee 10 comprises a flexible, resilient, elongate rubber or rubber-like elastomeric member having a wiping lip 12, a flexure groove 14 terminating short of the ends of the squeegee and a retention portion 16 having a pair of coplanar grooves 18 extending throughout the length thereof. The flexure grooves 14 terminate short of the ends of the squeegee to form reinforced ends 15 and the retention portion 16 is formed with integral flanges 17 having a greater width than the backing portion thereof and arranged to preclude engagement between the claws of the superstructure and the surface being wiped.

With particular reference to FIGURE 4, the cross-section of the one embodiment of the unitary squeegee is depicted as comprising a body of elastomeric material. In manufacturing the squeegee the two or more laminae of different hardness rubber or rubber-like material are vertically stacked and extend throughout the length of the squeegee. It can be seen that the retention portion 16 has an appreciably greater width than the wiping lip 12. Moreover at least a portion of the retention portion 16 is composed of elastomeric material having a hardness greater than the wiping lip 12. By virtue of the retention portion 16 having an appreciably greater width than thickness, and also due to the fact that at least a portion of the retention portion 16 is of greater hardness than other portions of the body, the unitary squeegee will have greater flexibility in a plane normal to the surface to be wiped than in a plane parallel to this surface. The claws, or feet, 36 on the ends of the secondary yokes straddle the flanges 19 formed on the back of the retention portion and have portions disposed in the grooves 18 as well as portions engageable with the upper surface of the retention portion.

In the unitary squeegee of FIGURE 4 the flexure grooves 14 have curved lower walls and form a reduced neck portion 21 which enables the wiping portion 23 to tilt, or layover, during movement of the wiper blade so that the wiping portion 23 and the lip 12 will assume the proper squeegeeing attitude relative to the surface being wiped. Layover, or tilting, movement of the wiping portion 23 is, of course, limited by engagement of the wiping portion 23 with the lower surfaces of the flanges 17.

Figure 6:
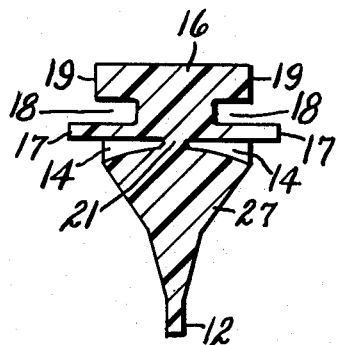
Figure 7:
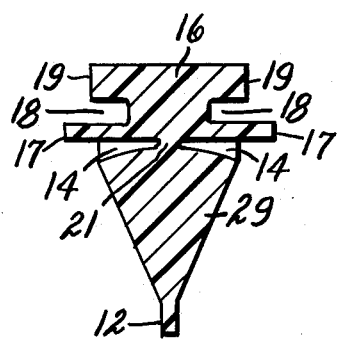
Figure 8:
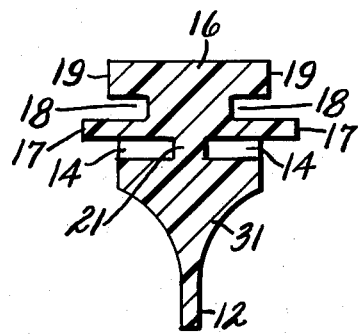

With reference to FIGURES 5 through 8, various cross-sectional configurations of unitary squeegees are shown. The squeegee configuration of FIGURE 5 differs from that of FIGURE 4 in that the wiping portion 25 has uniformly curved side surfaces which terminate in the wiping lip 12, whereas in the squeegee of FIGURE 4 the curved side surface of the wiping portion terminates short of the wiping edge. In the squeegee of FIGURE 6, the wiping portion 27 has a plurality of straight side surfaces which are angularly oriented relative to each other. In the squeegee of FIGURE 7, the wiping portion 29 is substantially triangular in configuration, while in the squeegee configuration of FIGURE 8 the flexure grooves 14 have parallel side walls, and the wiping portion 31 has both curved and straight side surfaces.

Any suitable means can be employed to assure that the squeegee will not slide out of the linkage; for example; by abutments at the outer ends of the blade as shown in United States Patent 2,824,331, issued February 25, 1958 to C. T. Wallis, assigned to the assignee of the present invention.

When the unitary squeegee 10 is assembled with the pressure distributing linkage 20 as shown in FIGURE 1, the resultant wiper blade assembly is readily flexible in a plane normal to the surface to be wiped, and relatively inflexible in a plane parallel thereto. The substantial rigidity of the unitary squeegee in the plane parallel to the surface to be wiped is effected by the interconnection of the unitary squeegee with the pressure distributing linkage which is substantially rigid in the plane parallel to the surface to be wiped due to the nesting relation of the yokes or levers. It can be seen that wiper arm pressure is applied to a plurality of spaced apart points throughout the length of the unitary squeegee, and wiper arm pressure is distributed in accordance with the geometry of the superstructure. The resultant wiper blade assembly will readily conform to curved surfaces and will be appreciably quieter in operation than present commercial wiper blade assemblies since there are no sliding metal to metal connections between the superstructure and the squeegee unit. Moreover, since the unitary squeegee does not embody any metal backing strip, scratching of the glass windshield surface is precluded. In addition, substantial manufacturing economies can be realized since the backing strip has been eliminated thereby resulting in material and labor savings.

While the embodiment of the invention as herein disclosed constitutes a preferred form, it is to be understood that other forms might be adopted.

What is claimed is as follows:

1. A unitary squeegee including, a flexible, resilient, elongate body of solid elastomeric material having portions of different hardness, said body having a retention portion of substantially greater width than thickness so as to have greater flexibility in a plane normal to the surface to be wiped than in a plane parallel to the surface to be wiped.

2. A unitary squeegee of solid elastomeric material having portions of different hardness with the hardest portion being of greater width than thickness so that the squeegee has greater flexibility in a plane normal to the surface to be wiped than in a plane parallel to the surface to be wiped.

3. A unitary squeegee of elastomeric material having portions of different hardness, said unitary squeegee having the hardest portion arranged along an edge opposite from its wiping edge and of greater width than thickness whereby the unitary squeegee is characterized by greater flexibility in a plane normal to the surface to be wiped than in a plane parallel to the surface to be wiped.

4. A unitary squeegee of elastomeric material having portions of different hardness, said squeegee having a relatively wide and thin retention portion and a relatively thin wiping lip such that the squeegee has greater flexibility in a plane normal to the surface to be wiped than in a plane parallel to said surface.

5. A unitary squeegee including, a flexible, resilient, elongate body of elastomeric material having a wiping lip along one edge and a retention portion of greater width than thickness along the opposite edge, the elastomeric material of said body being composed of portions of different hardness with the portion of greatest hardness constituting at least a part of said retention portion whereby said unitary squeegee has greater flexibility in a plane normal to the surface to be wiped than in a plane parallel to the surface to be wiped.

6. A unitary squeegee including, a flexible, resilient, elongate body of elastomeric material having a relatively wide retention portion and a relatively thin wiping lip, said elastomeric body being composed of portions of different hardness with the portion of greatest hardness constituting at least a part of said retention portion, said retention portion having a pair of longitudinally extending superstructure receiving grooves.

7. A unitary squeegee including, a flexible, resilient, elongate elastomeric body having a relatively wide retention portion and a relatively thin wiping lip, said elastomeric body being composed of portions of different hardness with the portion of greatest hardness constituting at least a part of said retention portion, said retention portion having a pair of longitudinally extending superstructure receiving grooves, said body having a pair of flexure grooves disposed inwardly of said superstructure receiving grooves and defining a pair of flanges therebetween.

8. The unitary squeegee set forth in claim 7 wherein said flexure grooves have parallel side walls.

9. The unitary squeegee set forth in claim 7 wherein said flexure grooves have diverging side walls.

10. The unitary squeegee set forth in claim 7 wherein said elastomeric body includes a wiping portion connected with said retention portion by a relatively thin neck.

11. The unitary squeegee set forth in claim 10 wherein said wiping portion has curvilinear side surfaces.

12. The unitary squeegee set forth in claim 10 wherein said wiping portion has rectilinear side surfaces.

13. A windshield wiper blade assembly including, a unitary squeegee of solid elastomeric material having portions of different hardness with the hardest portion having greater width than thickness so that the squeegee has greater flexibility in a plane normal to the surface to be wiped than in a plane parallel to the surface to be wiped, and a pressure distributing linkage comprising a plurality of movable members having their free ends movably connected with said unitary squeegee at longitudinally spaced apart points for distributing applied wiper arm pressure to said unitary squeegee.

14. A windshield wiper blade assembly including, a unitary squeegee comprising a body of solid elastomeric material having portions of different hardness with the hardest portion having greater width than thickness so that the squeegee has greater flexibility in a plane normal to the surface to be wiped than in a plane parallel to said surface, and a pressure applying superstructure operatively connected to said unitary squeegee for applying arm applied pressure to longitudinally spaced apart points thereon.

15. A windshield wiper blade assembly including, a unitary squeegee comprising a body of solid elastomeric material having a retention portion along one edge and a wiping lip along the opposite edge, said unitary squeegee having portions of different hardness with the retention portion being constituted at least in part by the hardest portion and having greater width than thickness so that the squeegee has greater flexibility in a plane normal to the surface to be wiped than in a plane parallel to said surface, and a pressure distributing linkage comprising a plurality of relatively movable members having their free ends movably connected with the retention portion of said unitary squeegee for distributing arm applied pressure to longitudinally spaced apart points thereon.

16. A unitary squeegee comprising coextensive longitudinally extending integral laminae of different hardness flexible material, the lamina of greatest hardness being of greater width than thickness such that the squeegee has greater flexibility in a plane normal to the surface to be wiped than in a plate parallel to such surface.

17. A unitary squeegee comprising coextensive longitudinally extending integral laminae of different hardness flexible material having a wiping lip along one edge and a retention portion of greater width than thickness and constituted at least in part by the hardest lamina along the opposite edge, said unitary squeegee being characterized by greater flexibility in a plane normal to the surface to be wiped than in a plane parallel to such surface.

18. A windshield wiper blade assembly including, a unitary squeegee comprising coextensive longitudinally extending integral laminae of different hardness flexible material with the hardest lamina being of greater width than thickness so that the squeegee has greater flexibility in a plane normal to the surface to be wiped than in a plane parallel to such surface, and a pressure distributing linkage comprising a plurality of interconnected members capable of relative movement only in a plane generally perpendicular to the surface to be wiped and connected with said unitary squeegee at a plurality of longitudinally spaced points for distributing wiper arm pressure thereto.

19. A windsheld wiper blade assembly including, a unitary squeegee comprising coextensive longitudinally extending integral laminae of different hardness flexible material with the hardest lamina being of greater width than thickness so that the squeegee has greater flexibility in a plane normal to the surface to be wiped than in a plane parallel to such surface, and pressure applying means operatively connected with said unitary squeegee at a plurality of longitudinally spaced relatively movable points thereon for transmitting wiper arm pressure thereto.

20. A windshield wiper blade assembly including, a unitary squeegee comprising coextensive longitudinally extending integral laminae of different hardness flexible material and having a wiping lip along one edge and a retention portion of greater width than thickness and constituted at least in part by the hardest lamina along the opposite edge, said unitary squeegee being characterized by greater flexibility in a plane normal to the surface to be wiped than in a plane parallel to such surface, and pressure applying means operatively connected with the retention portion of said unitary squeegee at a plurality of longitudinally spaced relatively movable points theeron for transmitting wiper arm pressure thereto.

References Cited in the file of this patent

UNITED STATES PATENTS

| | | |
|---|---|---|
| 1,825,376 | Vaughn | Sept. 29, 1931 |
| 2,543,383 | Scinta et al. | Feb. 27, 1951 |
| 2,715,745 | Jacobsen | Aug. 23, 1955 |
| 2,760,220 | Deibel | Aug. 28, 1956 |
| 2,861,289 | Nesson | Nov. 25, 1958 |
| 2,907,065 | Macpherson | Oct. 6, 1959 |

FOREIGN PATENTS

| | | |
|---|---|---|
| 755,120 | Great Britain | Aug. 15, 1956 |